US009963932B2

(12) United States Patent
Wang

(10) Patent No.: US 9,963,932 B2
(45) Date of Patent: May 8, 2018

(54) SAFETY GATE AND LOCKING DEVICE FOR THE SAME

(71) Applicant: DEMBY DEVELOPMENT CO., LTD., New Taipei (TW)

(72) Inventor: Tsung-Hsiang Wang, New Taipei (TW)

(73) Assignee: DEMBY DEVELOPMENT CO., LTD., New Taipei (TW)

( * ) Notice: Subject to any disclaimer, the term of this patent is extended or adjusted under 35 U.S.C. 154(b) by 0 days. days.

(21) Appl. No.: 15/249,923

(22) Filed: Aug. 29, 2016

(65) Prior Publication Data

US 2017/0067284 A1 Mar. 9, 2017

(30) Foreign Application Priority Data

Sep. 9, 2015 (CN) .................... 2015 2 0695123 U

(51) Int. Cl.
| *E06B 9/06* | (2006.01) |
| *E06B 9/02* | (2006.01) |
| *B62D 33/037* | (2006.01) |
| *E05B 65/00* | (2006.01) |
| *E05C 3/00* | (2006.01) |
| *E05C 5/04* | (2006.01) |
| *E06B 9/00* | (2006.01) |

(52) U.S. Cl.
CPC .......... *E06B 9/0692* (2013.01); *B62D 33/037* (2013.01); *E05B 65/0007* (2013.01); *E05B 65/0014* (2013.01); *E05C 3/00* (2013.01); *E05C 5/04* (2013.01); *E06B 9/02* (2013.01); *E06B 2009/002* (2013.01)

(58) Field of Classification Search
CPC ..... E05C 3/00; E05C 5/04; E05C 1/12; E05C 1/163; E05C 1/166; E06B 2009/002; E06B 9/02; E06B 9/0692; E05B 65/0007; Y10T 292/1016
USPC ................. 248/264; 292/34, 40, 140; 49/57
See application file for complete search history.

(56) References Cited

U.S. PATENT DOCUMENTS

| 291,672 | A | * | 1/1884 | Bourke | ............... E05B 63/0017 292/140 |
| 1,427,253 | A | * | 8/1922 | Appleby | .................. E05C 1/06 292/140 |
| 2,088,665 | A | * | 8/1937 | Pinson | .................... E05C 9/045 292/140 |
| 5,575,113 | A | * | 11/1996 | Huang | ...................... E06B 9/02 160/372 |
| 5,704,164 | A | * | 1/1998 | Huang | ...................... E06B 9/02 160/372 |

(Continued)

*Primary Examiner* — Blair M Johnson
(74) *Attorney, Agent, or Firm* — Shimokaji IP

(57) ABSTRACT

A safety gate has a gate body and at least one locking device. The at least one locking device is mounted on the gate body, and each has a fixing member, a sliding member, and a positioning member. The fixing member is tubular and has a closed end, at least one sliding protrusion, and a recess. The at least one sliding protrusion is formed on the closed end. The sliding member is mounted rotatably around the fixing member and has at least one guiding track and a holding hole. The at least one curved guiding track is formed on and protruding from an inner surface of the sliding member. Each guiding track has an inclined guiding surface to define a high end and a low end respectively at two ends of the guiding track.

10 Claims, 10 Drawing Sheets

(56) References Cited

U.S. PATENT DOCUMENTS

| | | | | |
|---|---|---|---|---|
| 5,738,389 A | * | 4/1998 | Marks | E05C 17/166 |
| | | | | 292/63 |
| 6,370,823 B1 | * | 4/2002 | Andersen | A01K 1/0017 |
| | | | | 49/57 |
| 7,210,319 B2 | * | 5/2007 | Artsiely | B60R 25/008 |
| | | | | 292/34 |

* cited by examiner

SAFETY GATE AND LOCKING DEVICE FOR THE SAME

BACKGROUND OF THE INVENTION

1. Field of the Invention

The present invention relates to a safety gate, and more particularly to a safety gate that can be easily positioned at a desired position.

2. Description of Related Art

A safety gate is arranged around an activity space of children to keep the children from entering a dangerous location. In use, a conventional safety gate is held in positions between two walls or a door frame with bolts or tying ropes. However, the conventional way of holding the conventional safety gate is laborious and time-consuming. In addition, the conventional safety gate is large in volume and is difficult to be stored or transported.

To overcome the shortcomings, the present invention tends to provide a safety gate to mitigate or obviate the aforementioned problems.

SUMMARY OF THE INVENTION

The main objective of the invention is to provide a safety gate that can be easily installed.

The safety gate has a gate body and at least one locking device. The gate body is composed of multiple rods. The at least one locking device is mounted on one of the rods of the gate body, and each one of the at least one locking device has a fixing member, a sliding member, and a positioning member. The fixing member is tubular and has a closed end, at least one sliding protrusion, and a recess. The at least one sliding protrusion is formed on and protrudes from the closed end. The recess is defined radially in the fixing member. The sliding member is mounted rotatably around the fixing member and has an open end, a closed end opposite the open end, at least one guiding track, and a holding hole. The at least one curved guiding track is formed on and protruding from an inner surface of the sliding member. Each one of the at least one guiding track has an inclined guiding surface to define a high end and a low end respectively at two ends of the guiding track. The at least one sliding protrusion respectively abuts slidably on the guiding surface of the at least one guiding track. The holding hole is defined radially in the sliding member. The positioning member is mounted in the recess in the fixing member and is selectively inserted into the holding hole in the sliding member to position the sliding member relative to the fixing member.

Other objects, advantages and novel features of the invention will become more apparent from the following detailed description when taken in conjunction with the accompanying drawings.

DETAILED DESCRIPTION OF PREFERRED EMBODIMENT

In the referenced application, when an element is mounted on another element, this means that the element can be mounted directly on another element or be mounted on another element by a middle element. When an element is connected to/with another element, this means that the element can be connected directly with another element or be connected to another element by a middle element.

Figure 1:
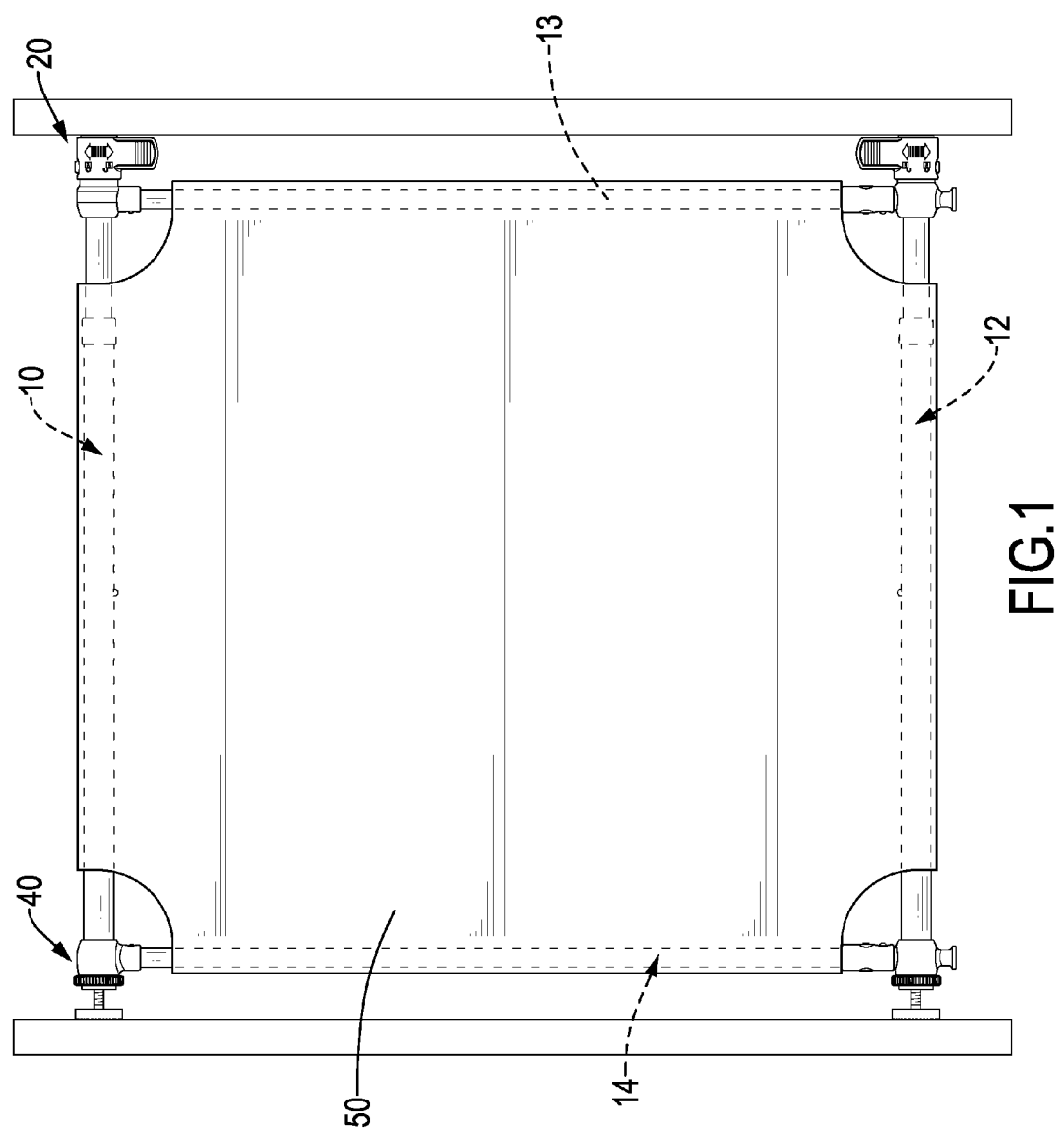
FIG. 1 is an operational front view of a safety gate in accordance with the present invention.
Figure 2:
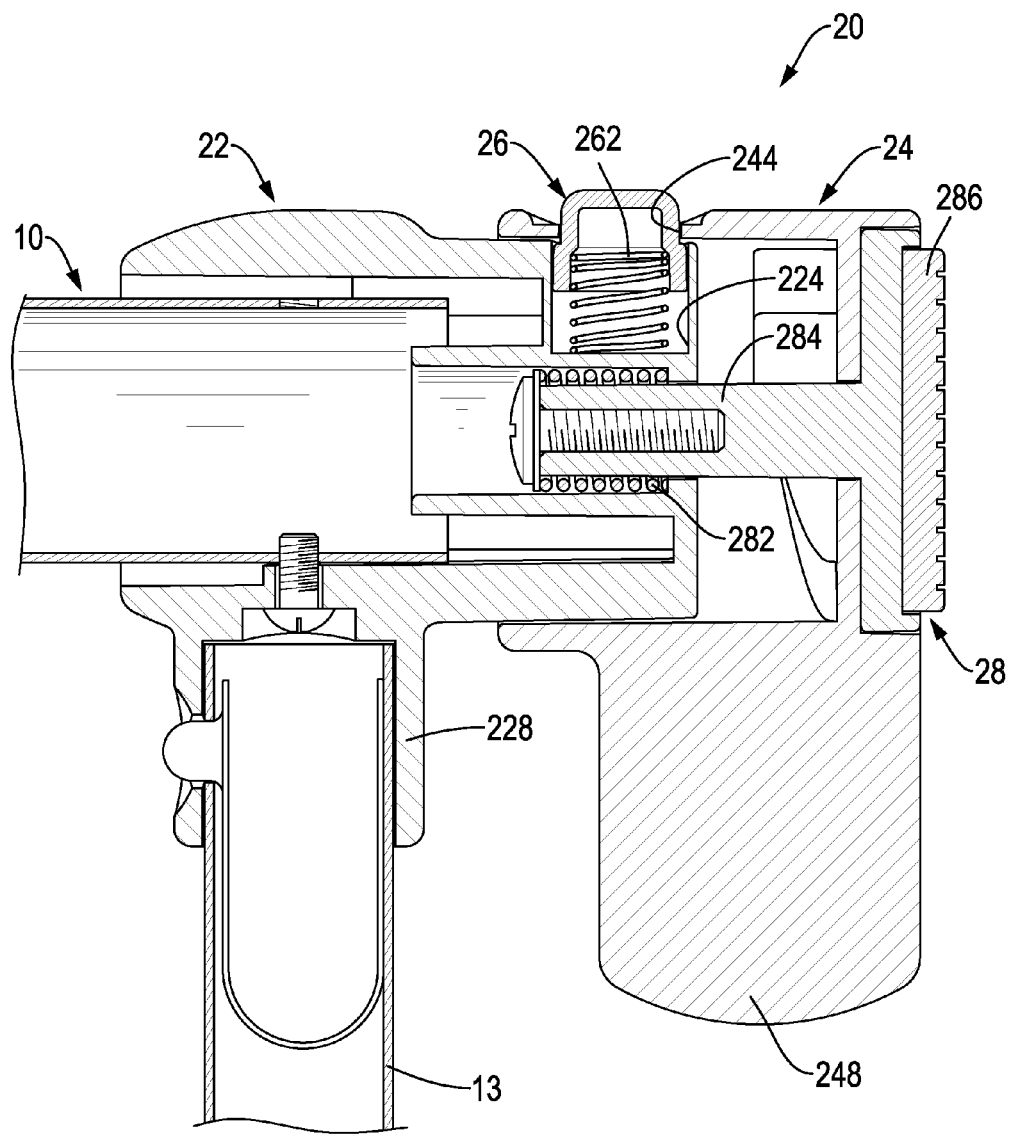
FIG. 2 is an enlarged cross sectional side view of the safety gate in FIG. 1.
Figure 3:
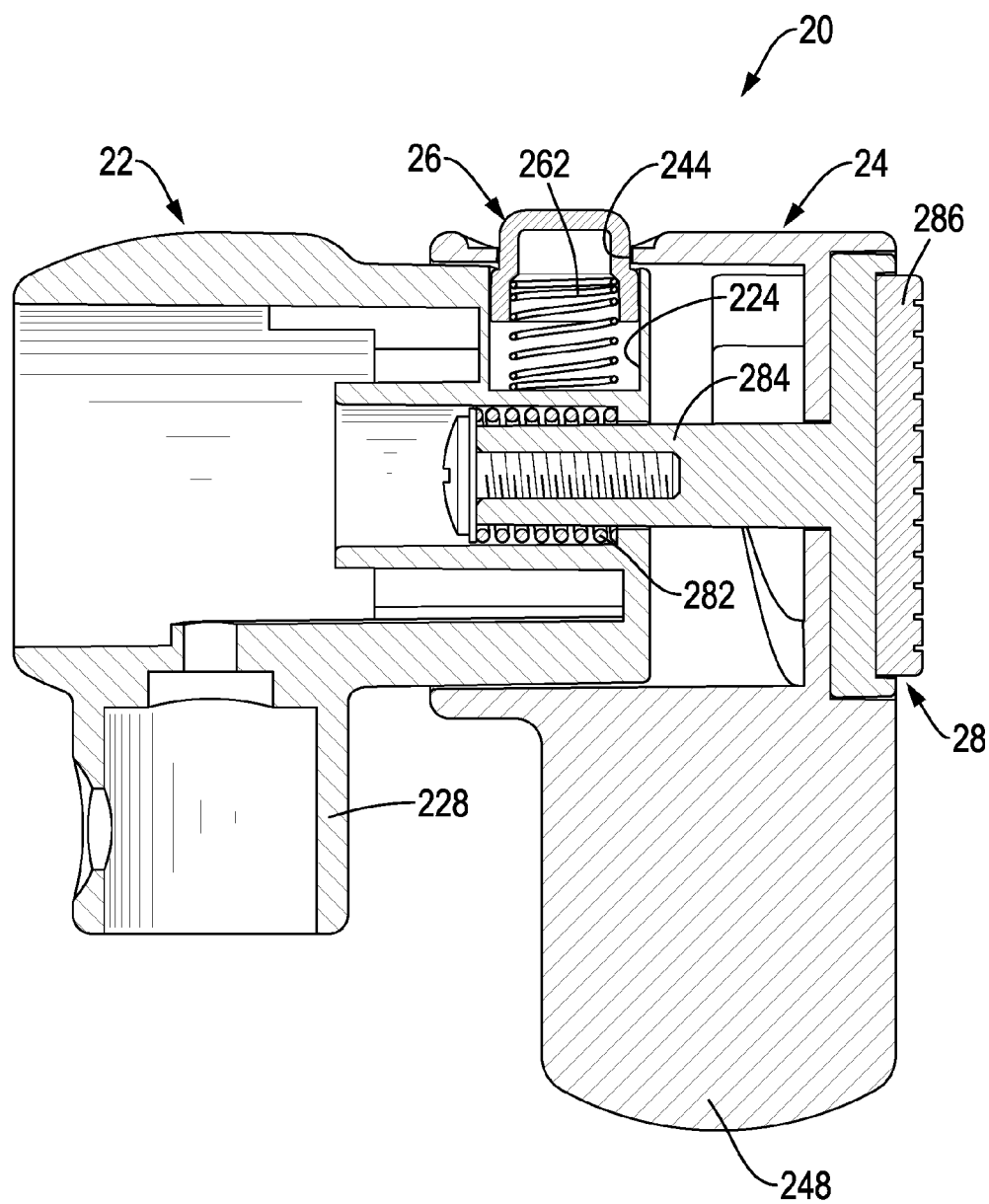
FIG. 3 is an enlarged cross sectional side view of a locking device of the safety gate in FIG. 1.
Figure 4:
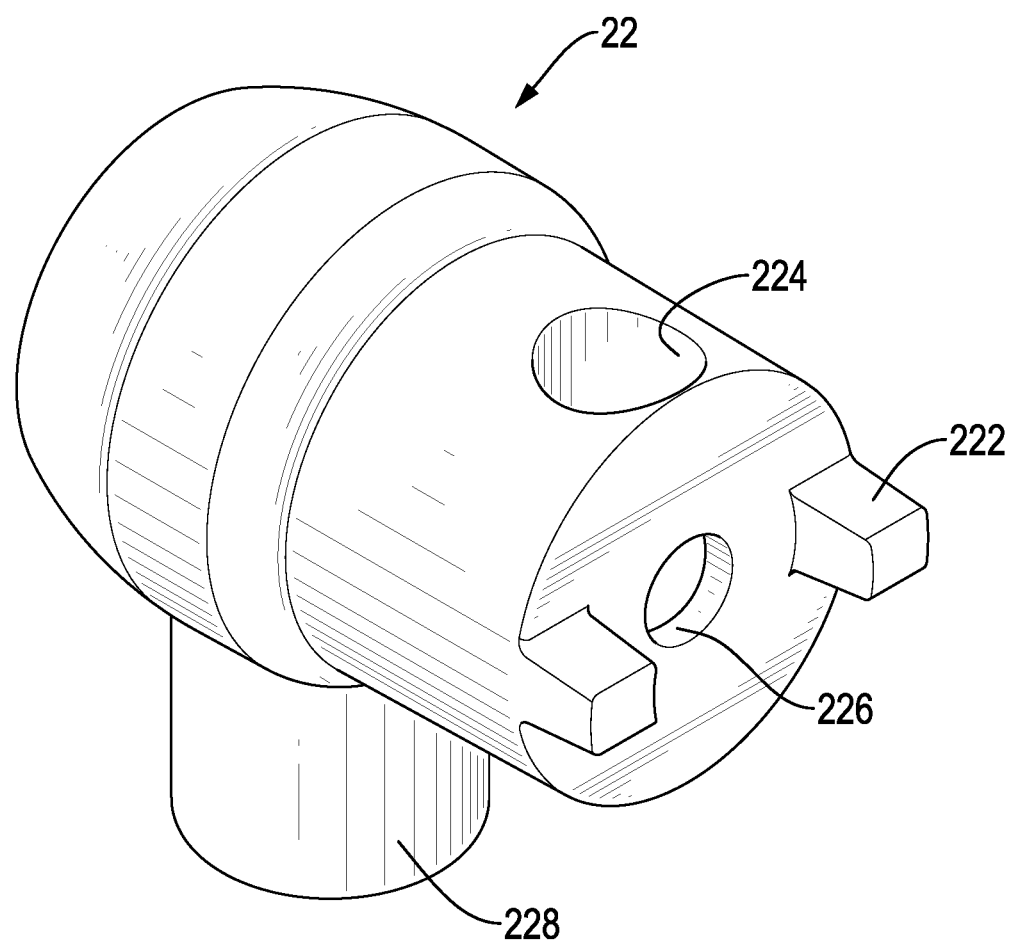
FIG. 4 is a perspective view of a fixing member of the locking device in FIG. 3.
Figure 5:
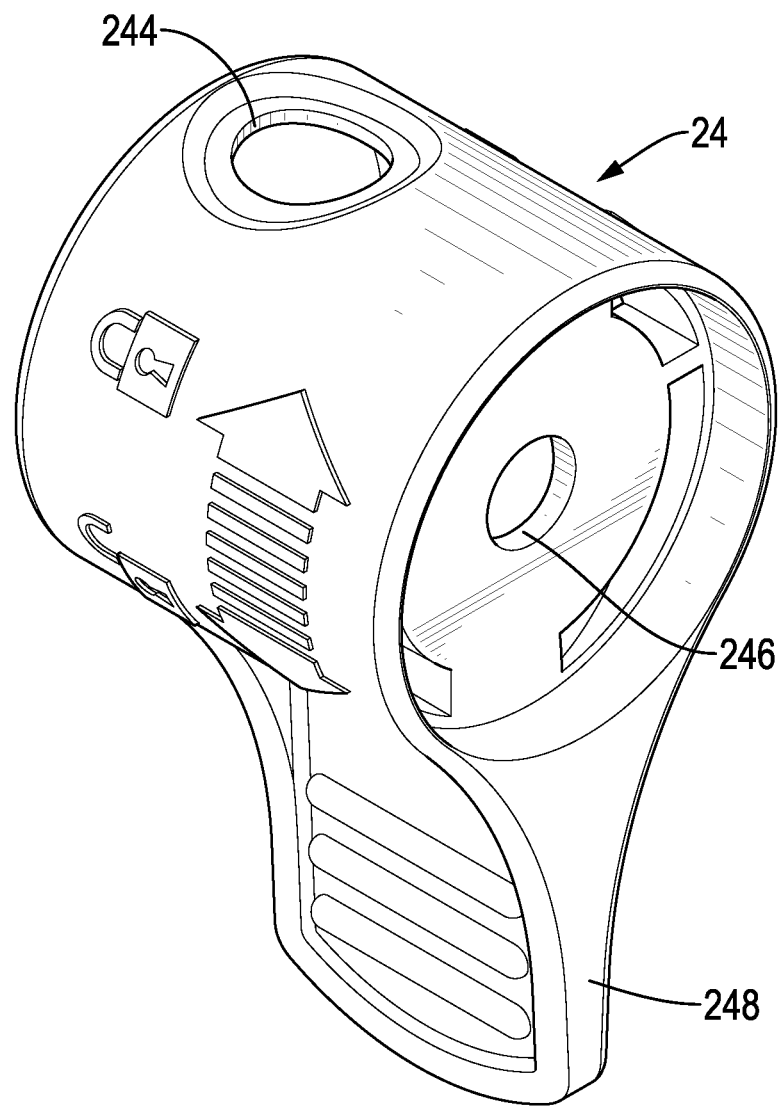
FIG. 5 is a perspective view of a sliding member of the locking device in FIG. 3.
Figure 6:
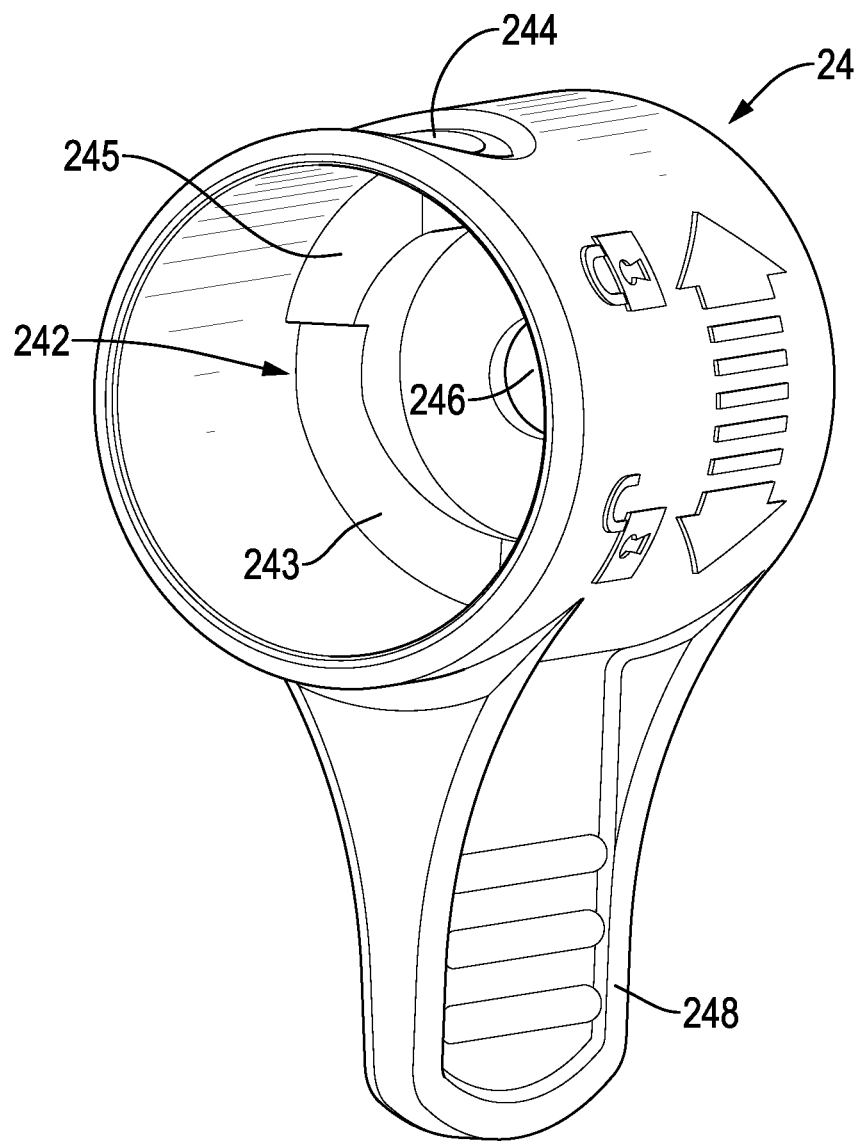
FIG. 6 is another perspective view of a sliding member of the locking device in FIG. 3.
Figure 7:
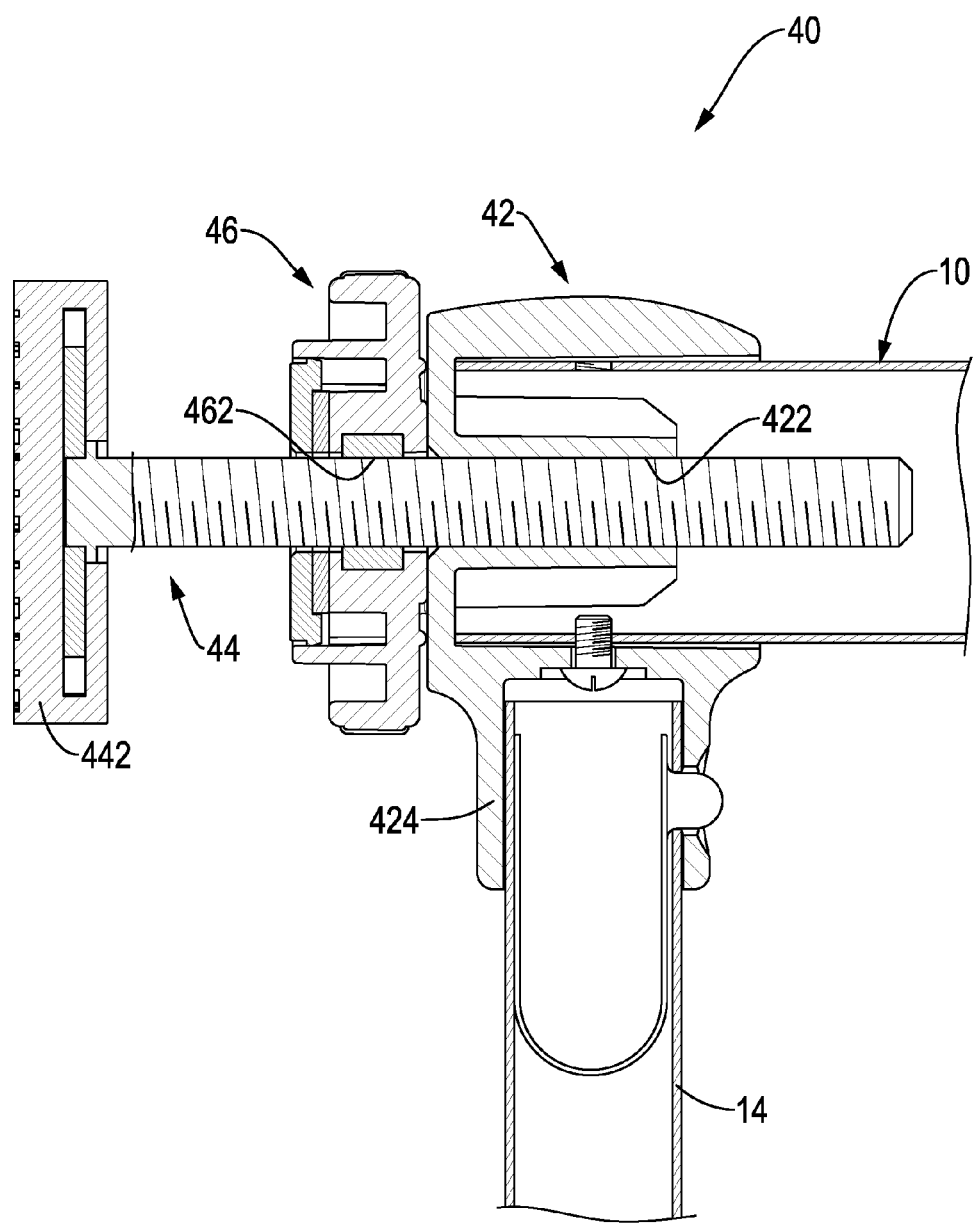
FIG. 7 is an enlarged cross sectional side view of an adjusting assembly of the safety gate in FIG. 1.
Figure 8:
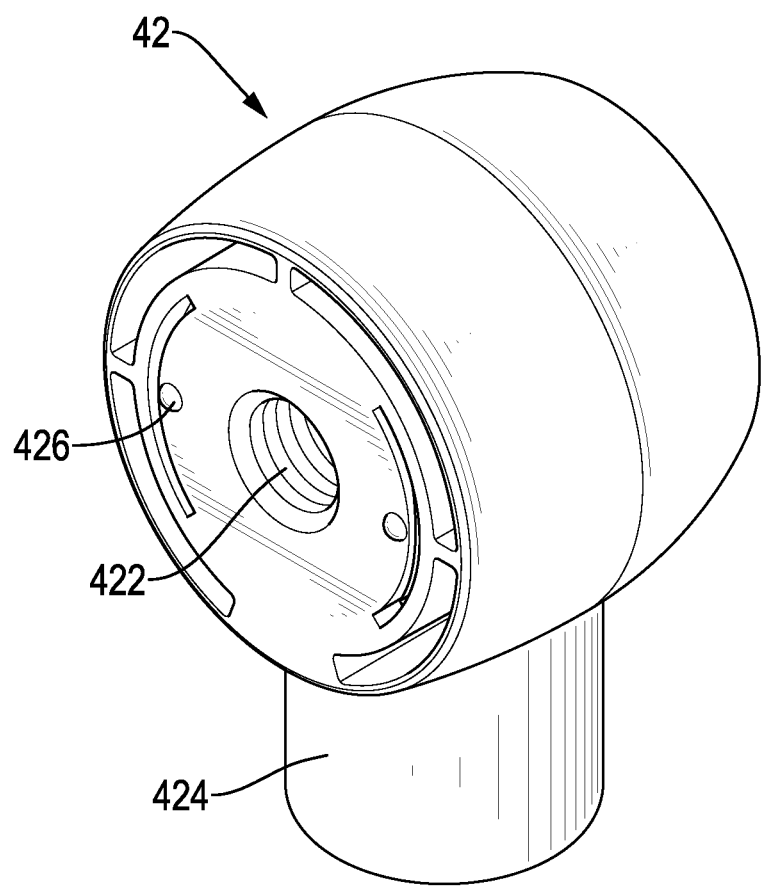
FIG. 8 is a perspective view of a pressing sleeve of the adjusting assembly in FIG. 7.
Figure 9:
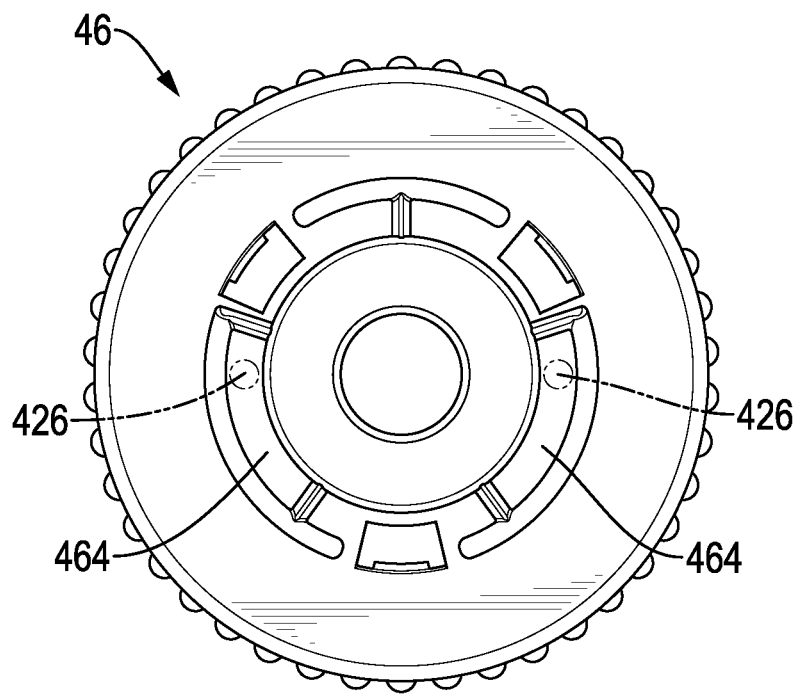
FIG. 9 is an end view of an adjusting knob of the adjusting assembly in FIG. 7.
Figure 10:
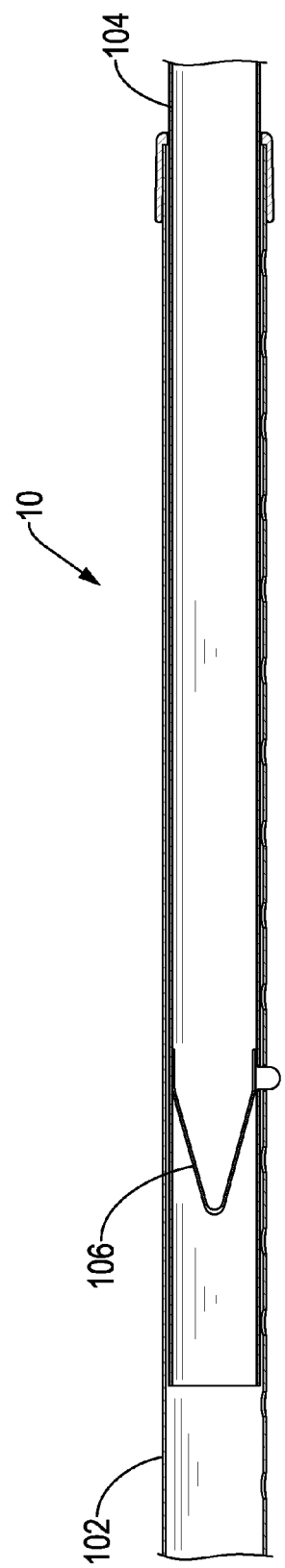
FIG. 10 is an enlarged cross sectional side view of a first rod of the safety gate in FIG. 1.

With reference to FIG. 1, a safety gate in accordance with the present invention comprises a gate body, at least one locking device 20, and at least one adjusting assembly 40. The gate body is composed of multiple rods. The rods may comprise a first rod 10, a second rod 12, a third rod 13, and a fourth rod 14. The first rod 10 and the second rod 12 are parallel with each other, and the third rod 13 and the fourth rod 14 are parallel with each other and are mounted between the first rod 10 and the second rod 12. With further reference to FIG. 10, each of the first rod 10 and the second rod 12 may comprise an outer tube 102 and an inner tube 104. One end of the inner tube 104 is inserted slidably into an end of the outer tube 102. A resilient tab 106 is mounted in the inner tube 104 and has a securing protrusion protruding out from the inner tube, and engages a positioning hole defined in the outer tube 102. Accordingly, the first rod 10 or the second rod 12 can be expanded or retracted to a desired length for fitting with walls or door frames having different widths.

In addition, the gate body may further comprise a fabric 50 mounted around and on the rods 10,12,13,14 to provide a shading effect.

The at least one locking device 20 is mounted on one of the rods 10, 12 of the gate body. Preferably two locking devices 20 are implemented and are respectively mounted on ends of the first rod 10 and the second rod 12.

With reference to FIGS. 2 to 6, each locking device 20 comprises a fixing member 22, a sliding member 24, a positioning member 26, and a recoiling assembly 28. The fixing member 22 is tubular, is mounted around an end of a corresponding rod 10,12, and has a closed end, at least one sliding protrusion 222, a recess 224, a through hole 226, and a mounting sleeve 228. The closed end is defined at an end of the fixing member 22 opposite to the corresponding rod 10,12. The at least one sliding protrusion 222 is formed on and protrudes from the closed end. Preferably, two sliding protrusions 222 are implemented. The recess 24 is defined radially in the fixing member 22 at a position adjacent to the closed end and has a bottom. The through hole 226 is defined axially through the closed end. The mounting sleeve 228 is radially formed on and protrudes from the fixing member 22, is radially opposite the recess 224, and is detachably mounted around and on one of the ends of the third rod 13. Accordingly, the third rod 13 can be connected with the first rod 10 or the second rod 12 by the fixing member 22 of the locking device 20. Alternatively, the third rod 13 can be directly connected with the first rod 10 and the second rod 12, so the mounting sleeve 228 on the fixing member 22 can be omitted.

The sliding member 24 is mounted rotatably around the fixing member 22 and has an open end, a closed end opposite the open end, at least one curved guiding track 242, a holding hole 244, a through hole 246, and a pushing tab 248. The open end of the sliding member 24 is mounted around and on the closed end of the fixing member 22. The at least one curved guiding track 242 is formed on and protrudes from an inner surface of the sliding member 24. Preferably, two guiding tracks 242 are implemented. Each guiding track 242 has an inclined guiding surface 243 to define a high end and a low end respectively at two ends of the guiding track 242. The at least one sliding protrusion 222 on the fixing member 22 respectively abuts slidably on the inclined guiding surface 243 of the at least one guiding track 242 In addition, a limiting protrusion 245 is formed on and protrudes from the guiding surface 243 at a position on the high end of the guiding track 242. The holding hole 244 is defined radially in the sliding member 24. The through hole 246 is axially defined through the closed end of the sliding member 24. The pushing tab 248 is radially formed on and protrudes from the sliding member 24 to enable a user to push the sliding member 24 to rotate relative to the fixing member 22 easily.

The positioning member 26 is mounted in the recess 224 in the fixing member 22 and is selectively inserted into the holding hole 244 in the sliding member 24 to position the sliding member 24 relative to the fixing member 22. In addition, a spring 262 is mounted in the recess 224 and has an end abutting against the positioning member 26 to push the positioning member 26 out of the recess 224 and to engage the holding hole 244 in the sliding member 24.

The recoiling assembly 28 is connected with the sliding member 24 to provide a force for recoiling the sliding member 24 to an original position. The recoiling assembly 28 comprises a recoil spring 282 and a rod body 284, The recoil spring 282 is mounted in the sliding member 24 and abuts against an inner surface of the closed end of the fixing member 22. Preferably, the recoil spring 282 is a compression spring. The rod body 284 is mounted through the through holes 226,246 in the fixing member 22 and the sliding member 24, is connected with the recoil spring 282, and has a T-shaped cross section. In addition, a slip-proof pad 286 is attached to the rod body 284 at an end opposite the recoil spring 282.

With the a locking device 20, when the sliding member 24 is rotated relative to the fixing member 22, the sliding protrusions 222 on the fixing member 22 can slide relative to and along the inclined guiding surfaces 243 from the low ends to the high ends of the guiding tracks 242. Accordingly, the sliding member 24 can be pushed to axially move relative to the fixing member 22 to enable the sliding member 24 or the slip-proof pad 286 on the rod body 284 to abut against a wall or a side of a door frame. At this time, the recoil spring 282 is compressed, and the positioning member 26 is pushed out from the recess 224 by the spring 262 to engage the holding hole 244 in the sliding member 24 to securely hold the sliding member 24 in position relative to the fixing member 22.

When the positioning member 26 is pushed to disengage from the holding hole 244, the sliding member 24 can be pushed by the recoil spring 282 to move backward relative to the fixing member 22 to leave the wall or the door frame. With the sliding movement of the sliding protrusions 222 on the fixing member 22 relative to the inclined guiding surfaces 243 from the high ends to the low ends of the guiding track 242, the sliding member 24 can be automatically rotated relative to the fixing member 22 to the original position.

With reference to FIGS. 1 and 7 to 9, at least one adjusting assembly 40 is mounted on the gate body. Preferably, two adjusting assemblies 40 are implemented and are respectively mounted on ends of the first rod 10 and the second rod 12 opposite the locking devices 20. Two ends of the fourth rod 14 can be connected with the adjusting assemblies 40 or be connected with the first rod 10 and the second rod 12 directly.

Each adjusting assembly 40 comprises a pressing sleeve 42, an adjusting rod 44, and an adjusting knob 46. The pressing sleeve 42 is mounted around an end of the first rod 10 or the second rod 12 and has a through hole 422 axially defined through the pressing sleeve 42. In addition, the pressing sleeve 42 may comprise a mounting sleeve 424 radially formed on and protruding from the pressing sleeve 42 and mounted around an end of the fourth rod 14 to connect the fourth rod 14 with the pressing sleeve 42 of the adjusting assembly 40.

The adjusting rod 44 is applied to abut against a wall or a side door frame, is a threaded rod, is mounted in the through hole 422 in the pressing sleeve 42, and has an end extending out of the through hole 422 in the pressing sleeve 42 and provided with a slip-proof cap 442. The adjusting knob 46 is mounted around and on the adjusting rod 44 at a position between the pressing sleeve 42 and the slip-proof cap 442 and has a threaded hole 462 screwed with the threaded adjusting rod 44.

In addition, the adjusting knob 46 of each adjusting assembly 40 further has multiple curved limiting grooves 464. The limiting grooves 464 are defined in a side of the adjusting knob 46 facing the pressing sleeve 42 and are arranged in a circle. The pressing sleeve 42 has an end facing the adjusting knob 46 and provided with at least one limiting bump 426 respectively mounted slidably in at least one of the curved limiting grooves 464 in the pressing sleeve 42. With the arrangement of the curved limiting grooves 464 and the limiting bump 426, the rotation angle of the adjusting knob 46 relative to the pressing sleeve 42 can be limited to prevent the adjusting rod 44 from leaving the wall or the door frame unintentionally.

To install the safety gate onto two walls or a door frame, the adjusting rods 44 of the adjusting assemblies 40 are attached to one of the walls or a side of the door frame. With the rotation of the adjusting rods 44, the extension lengths of the adjusting rods 44 relative to the pressing sleeves 42 can be changed to adjust the distance between the wall and the gate body. Then, the sliding members 24 of the locking devices 20 are rotated to make the sliding members 24 or the slip-proof pads 284 on the rod body 28 abut against the other wall or the other side of the door frame. Accordingly, the safety gate can be conveniently and firmly installed on the walls or the door frame without using tools. In addition, with the adjusting assemblies 40, the safety gate in accordance with the present invention can be applied to be installed on walls or door frames having different widths and is versatile in use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A locking device for a safety gate comprising:
   a fixing member being tubular and having
      a closed end;
      at least one sliding protrusion formed on and protruding from the closed end; and
      a recess defined radially in the fixing member;
   a sliding member mounted rotatably around the fixing member and having
      an open end;
      a closed end opposite the open end;
      at least one guiding track formed on and protruding from an inner surface of the sliding member, and each one of the at least one guiding track having an inclined guiding surface to define a high end and a low end respectively at two ends of the guiding track, wherein the at least one sliding protrusion respectively abuts slidably on the guiding surface of the at least one guiding track; and
      a holding hole defined in the sliding member; and
   a positioning member mounted in the recess in the fixing member and selectively inserted into the holding hole in the sliding member to position the sliding member relative to the fixing member.

2. The locking device as claimed in claim 1, wherein the guiding surface of each one of the at least one guiding track has a limiting protrusion formed on and protruding from the high end of the guiding track and selectively abutting a corresponding one of the at least one sliding protrusion on the fixing member.

3. The locking device as claimed in claim 1 further comprising a recoiling assembly connected with the sliding member to provide a force for recoiling the sliding member.

4. The locking device as claimed in claim 3, wherein
   the sliding member further has a first through hole defined through the closed end of the sliding member;
   the fixing member further has a second through hole defined through the closed end of the fixing member; and
   the recoiling assembly comprises
      a recoil spring mounted in the sliding member and abutting against an inner surface of the closed end of the fixing member; and
      a rod body mounted through the first through hole in the sliding member and the second through hole of the fixing member, connected with the recoil spring, and having a T-shaped cross section.

5. The locking device as claimed in claim 4, wherein the recoiling assembly further has a slip-proof pad attached to the rod body at an end opposite the recoil spring.

6. A safety gate comprising:
   a gate body composed of multiple rods; and
   at least one locking device mounted on one of the rods of the gate body, and each one of the at least one locking device comprising:
      a fixing member being tubular and having
         a closed end;
         at least one sliding protrusion formed on and protruding from the closed end; and
         a recess defined radially in the fixing member;
      a sliding member mounted rotatably around the fixing member and having
         an open end;
         a closed end opposite the open end;
         at least one guiding track formed on and protruding from an inner surface of the sliding member, and each one of the at least one guiding track having an inclined guiding surface to define a high end and a low end respectively at two ends of the guiding track, wherein the at least one sliding protrusion respectively abuts slidably on the guiding surface of the at least one guiding track; and
         a holding hole defined in the sliding member; and
      a positioning member mounted in the recess in the fixing member and selectively inserted into the holding hole in the sliding member to position the sliding member relative to the fixing member.

7. The safety gate as claimed in claim 6 further comprising at least one adjusting assembly mounted on the gate body, and each one of the at least one adjusting assembly comprising:
   a pressing sleeve mounted on the gate body and having a through hole axially defined through the pressing sleeve;
   an adjusting rod being a threaded rod, mounted in the through hole in the pressing sleeve, and having an end extending out of the through hole in the pressing sleeve and provided with a slip-proof cap; and
   an adjusting knob mounted on the adjusting rod at a position between the pressing sleeve and the slip-proof cap and having a threaded hole screwed with the threaded adjusting rod.

8. The safety gate as claimed in claim 7, wherein
   the adjusting knob of each one of the at least one adjusting assembly has multiple curved limiting grooves defined in a side of the adjusting knob facing the pressing sleeve and arranged in a circle; and
   the pressing sleeve of each one of the at least one adjusting assembly has an end facing the adjusting knob of the adjusting assembly and provided with at least one limiting bump respectively mounted slidably in at least one of the curved limiting grooves in the adjusting knob.

9. The safety gate as claimed in claim 7, wherein
   the gate body comprises a first rod and a second rod being parallel with the first rod;
   each one of the first rod and the second rod has a first end and a second end opposite the first end;
   the at least one locking device is implemented as two in amount, and the two locking devices are mounted respectively on the first end of the first rod and the first end of the second rod; and
   the at least one adjusting assembly is implemented as two in amount, and the two adjusting assemblies are mounted respectively on the second end of the first rod and the second end of the second rod.

10. The safety gate as claimed in claim 9, wherein
   the gate body further has a third rod mounted between the first rod and the second rod and having two ends; and
   the fixing member of each locking device further comprises a mounting sleeve formed on the fixing member, being radially opposite the recess in the fixing member, and detachably mounted around and on one of the ends of the third rod.

* * * * *